United States Patent
Tofighbakhsh et al.

(10) Patent No.: US 8,526,932 B2
(45) Date of Patent: Sep. 3, 2013

(54) PERFORMANCE ZONES

(75) Inventors: Mostafa Tofighbakhsh, Cupertino, CA (US); Shyam Parekh, Orinda, CA (US); David Wolter, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/314,452

(22) Filed: Dec. 8, 2011

(65) Prior Publication Data

US 2013/0150011 A1 Jun. 13, 2013

(51) Int. Cl.
*H04M 3/00* (2006.01)

(52) U.S. Cl.
USPC ........ 455/418; 455/435.1; 455/436; 455/437; 370/331; 370/332; 370/254

(58) Field of Classification Search
USPC ........... 455/418, 561, 355, 435.3, 434, 562.1, 455/509, 423, 456.1, 435.2, 436; 430/314; 210/502.1, 198.2, 656; 370/225, 252, 331, 370/328, 410, 338, 310, 342; 502/402, 404
See application file for complete search history.

(56) References Cited

U.S. PATENT DOCUMENTS

| | | | |
|---|---|---|---|
| 7,991,397 B2 * | 8/2011 | Willey et al. | 455/435.2 |
| 2004/0152491 A1 * | 8/2004 | Lobinger et al. | 455/561 |
| 2006/0135140 A1 * | 6/2006 | Rothman et al. | 455/418 |
| 2006/0211402 A1 * | 9/2006 | Hofmann | 455/355 |
| 2008/0095097 A1 * | 4/2008 | Mehta et al. | 370/328 |
| 2009/0082020 A1 * | 3/2009 | Ch'ng et al. | 455/435.3 |
| 2009/0143065 A1 * | 6/2009 | Mattila | 455/423 |
| 2010/0105382 A1 * | 4/2010 | Gallagher | 455/434 |
| 2011/0081931 A1 * | 4/2011 | Kuwada et al. | 455/509 |
| 2012/0008595 A1 * | 1/2012 | Wang | 370/331 |
| 2012/0063300 A1 * | 3/2012 | Sahin et al. | 370/225 |

* cited by examiner

*Primary Examiner* — Mahendra Patel
(74) *Attorney, Agent, or Firm* — Woodcock Washburn LLP

(57) ABSTRACT

Performance of a mobile device can be regulated base on the performance zone in which the mobile device is located. Applications can be executed via the mobile device in accordance with locally imposed rules and policies associated with the performance zone. The rules and policies can be stored on the mobile device. The rules and policies can be associated with a color codes that are associated with respective performance zones.

19 Claims, 12 Drawing Sheets

| Zone | Type | Color Code | Significance |
|---|---|---|---|
| 1 | LTE & Location | Red | Bandwidth Restrictions |
| 2 | Wi-Fi & Location | Green | No Bandwidth Restrictions |
| 3 | Excellent Channel Condition & Location | Yellow | Large Bursts Of Data Allowed |
| 4 | Okay Channel Condition & Location | Orange | Some Data May Be Time Delayed |

FIGURE 3

PERFORMANCE ZONES

TECHNICAL FIELD

The technical field generally relates to communications and more particularly to performance zones for controlling traffic in order to regulate performance of devices and applications in a communications network.

BACKGROUND

Users of mobile devices are constantly seeking improved performance and experiences. However, from a network provider's perspective, maintaining consistent performance while conditions change can be quite challenging. For example, performance characteristics can change across networks and within networks depending on, for example, traffic load, resource use, resource availability, available bandwidth, time of day, device location, channel condition within a cellular site, and a network's capabilities of supporting various applications. Attempts to address this problem typically have relied on centralized solutions that entail heavy signaling overhead to renegotiate the performance parameters that can be made available to a device as network conditions change.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

In an attempt to mitigate the need for signaling overhead, and to improve performance and user experience, applications can be deployed via a mobile device in accordance with locally imposed rules and policies based on a zone (also referred to herein as a performance zone) in which the device is located. The rules and policies can be stored on the mobile device. The rules and policies can be associated with an indicators or labels, such as a color codes or other indicators for example, that are associated with respective performance zones. The rules can be implied from Cell ID, RSSI (signal strength indicator), user location, alternative channel conditions, and/or user demands, or the like.

In an example embodiment, network boundaries can be logically divided into zones. Each zone may comprise a region of coverage of a cell site, a region of coverage of a subset of a cell site, a region of coverage of a wireless local area network (e.g., a Wi-Fi hotspot), or the like, or any appropriate combination thereof. A cell site may comprise, for example, a micro cell, pico cell, femto cell, or macro cell. Zones can be associated with multi-dimensional color codes. Each color code within a zone can represent prevailing network conditions, and can imply current laws and/or ordinances governing use of applications, such as, for example, bandwidth demand, traffic burstiness, Quality of Service (QoS) requirements, other demands on the network resources, or the like.

When a device joins a network, on a periodic basis, on an aperiodic basis, or in response to any appropriate trigger (e.g., change in network or subscription conditions) the device can determine if a new indicator or label (e.g., color code) should be applied. The device can be informed about, or can deduce, the zone it belongs to or is about to join, and/or the color code associated with the zone. Accordingly, an application can be deployed/executed based on the color code as appropriately modified by, for example, the current location of the device, the prevailing channel conditions, and/or current network conditions.

BRIEF DESCRIPTION OF THE DRAWINGS

Reference will now be made to the accompanying drawings, which are not necessarily drawn to scale.

FIG. 3 illustrates an example list of available zones and associated color codes.

DETAILED DESCRIPTION OF ILLUSTRATIVE EMBODIMENTS

Aspects of the instant disclosure are described more fully herein with reference to the accompanying drawings, in which example embodiments are shown. In the following description, for purposes of explanation, numerous specific details are set forth in order to provide a understanding of the various embodiments. However, the instant disclosure may be embodied in many different forms and should not be construed as limited to the example embodiments set forth herein. Like numbers refer to like elements throughout.

As described herein, color codes, associated with specific zones, can be used as an index to access rules and/or policies from a local copy of a rulebook. The rules/policies can be applied to applications executing on a mobile device within the zone, such that the application is executing in compliance with the rules/policies.

Figure 1:
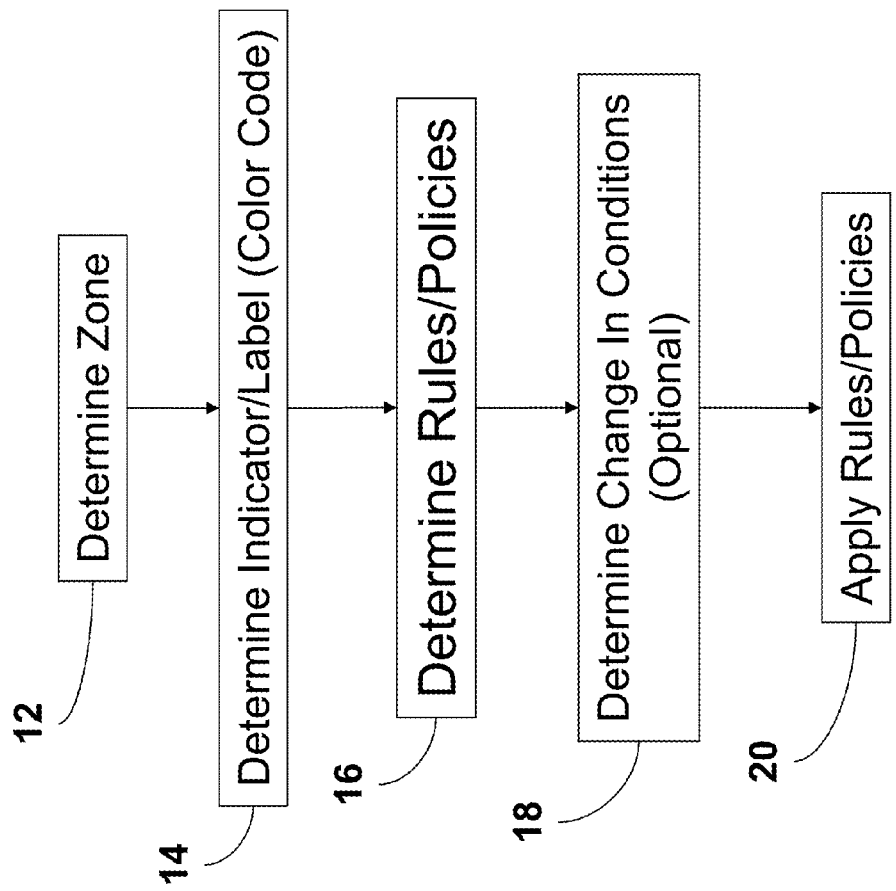
FIG. 1 is a flow diagram of an example process for regulating performance of a device utilizing a performance zone.

FIG. 1 is a flow diagram of an example process for regulating performance of a device utilizing a performance zone. A zone is determined at step 12. A zone can comprise any appropriate zone. For example, a zone can comprise a region of coverage of a network, a portion of a region of coverage of a network, a region of coverage of a cell site, a region of coverage of a subset of a cell site, a region of coverage of a wireless local area network (e.g., a Wi-Fi hotspot), or the like, or any appropriate combination thereof. Cell sites can include micro cells, pico cells, macro cells, femto cells, or the like, or any appropriate combination thereof. In an example scenario illustrating a mobile device being in multiple zones, a user of a mobile device could go to a sporting event at a stadium. At the stadium, the user's mobile device may be within an area of coverage of a wireless local area network (e.g., Wi-Fi hotspot) and an area of coverage of an LTE network.

An indicator or label associated with a zone, or zones, can be determined at step 14. In an example embodiment, the indicator or label can comprise a color code. Although a color code is described herein, it is to be understood that any appropriate indicator or label may be utilized. In example embodiments, a color code can represent prevailing network conditions and/or imply specific laws and/or ordinances, or the like, that govern the execution of applications on a mobile device in a communications system. The label or indicator can be an index or pointer to associated rules/policies (e.g., a rule book). The label or indicator can act as a proxy for associated rules/policies. For example, when a device receives an indication of a label/indicator, the label/indicate can act as a proxy for associated rules/policies, and the device can implement the rules/policies associated with that label/indicator. In an example embodiment, a color code could be associated with a class of applications and rules corresponding to the current color code for that class would govern the traffic profile of the application.

The color code, or codes, associated with a zone can be obtained in any appropriate manner. For example, when a mobile device joins a network, the network can provide an indication of a color code to the mobile device. The color code can be based on the location of the mobile device (e.g., current zone in which the mobile device is located) and/or current network conditions. In another example embodiment, when a mobile device determines the zone, or zones, in which it is located, the mobile device can access locally stored information (e.g., stored in memory of the mobile device) to determine the color code associated with the zone, or zones. The mobile device may, as explained in more detail below, use the color code to determine rules/policies associated with the color code. In an example embodiment, the mobile device could query the network to determine if any conditions exist that would change the color code and/or modify the rules/policies associated with the color code.

Rules and/or policies governing use of the mobile device are determined at step 16. Rules/policies can be obtained via any appropriate mechanism in any appropriate manner. For example, upon determining a current color code, the mobile device can consult a local copy (e.g., stored in memory of the mobile device) of a rulebook, utilizing the current color code as an index for the rules/policies governing use of the mobile device and applications while in the current zone. In an example embodiment, execution of applications via the mobile device will conform to the zone's color code rules/policies as long as the mobile device is within the current zone. An application automatically can switch to a new rule/policy when the color code changes due to, for example, a location change, a change is subscriber preferences, a change in network conditions, or the like, or any appropriate combination thereof. The color codes also may change due to specific network policies, e.g., due the time of the day and/or day of the week.

A color code can be indicative of usage of bandwidth, traffic burstiness, Quality of Service (QoS) requirements, and/or other demands on network resources. Examples of applications executing on a mobile device that may need to execute in compliance with a rules and/or policies associated with a color code can include software updates, streaming media, podcasts, voice communications, internet usage, web downloads, or the like. For example, an application may join the network and have a need to pull a summary of news from internet servers. It may look at its current color code which can be, for example, reflective of the prevailing channel conditions, user location, and time of the day, and index it into a lookup table for appropriate guidance on how it can go forward and pull the news. This can result in waiting for a certain amount of time or until a specified improvement in its color code with none or minimal additional signaling.

In another example, the user may have a large file to share or upload, and the user could wait until a specified improvement in the color code. This could include, for example, waiting until the user's device connects to a Wi-Fi network, or the like.

In another example, a color code may change from green to red, and therefore the device would refrain from any further transmission for a specified set of applications until the color code changed to more permissible code such as yellow or green.

Any change in conditions that may affect the current zone, color code, and/or associated rules/policies could be determined at step 18. Note that conditions would be initially determined in order to determine a color code in step 14. Thus, determining a change in conditions at step 18 could be optional. Example conditions that may affect the current zone, color code, and/or associated rules/policies can include, time of day, resource use, resource availability, amount of communication traffic in a zone, etc. Appropriate rules and/or policies are applied at step 20. Thus, any application that is executed via the mobile device, will be executed in compliance with the applied rules and/or policies. A color code associated with a mobile device can change while an application is executing on the mobile device. Thus, the ongoing application would be appropriately adapted in accordance with the rules/policies corresponding to the new color code.

In an example embodiment, a service provider could establish its own specification for color codes and corresponding sets of rules for different applications. Color codes could be derived from various key performance indicators (KPIs) for the network. KPIs can include any appropriate performance indicator, such as, for example, number of complaints received, wait times, call volume, average time to answer a call, customer satisfaction, bit error rates, downtime, network congestion, dropped calls, channel conditions, user location, etc. For example if a user is in downtown San Francisco, and average user traffic is below some threshold, the network may broadcast orange as the color code for certain applications/devices.

In an example embodiment, the rulebook that specifies the rules/policies for different zones can be stored in memory on the mobile device. The rulebook could be publically available and stored on each mobile device. The rules/policies could be applicable to the applications executable on the mobile device, operating systems on the mobile device, middleware on the mobile device, or the like, or any appropriate combination thereof. Dynamic assignment of color codes can allow a service provider to control the load on the network in a distributed manner. Furthermore, dynamic assignment of color codes can enable applications to quickly adapt themselves to prevailing conditions by shaping their traffic use in a manner that is best able to preserve their Quality of Experience (QoE).

When a mobile device is to perform a handoff (e.g., move from one zone to another zone), the mobile device could obtain the color codes associated with each candidate zone to which the mobile device could be handed off. And, when the zone is determined, the appropriate color code for that zone could be utilized to apply the appropriate rules/policies. In an example embodiment, the selection of the handoff site could be based on the available color codes. Thus, if more than one zone is available for handoff, the mobile device could be handed off to the zone with the most favorable color code and associated rule/policies. For example, if one zone is undergoing traffic congestion, and the other is not, the mobile device could be handed off to the zone with the lesser traffic congestion.

Figure 2:
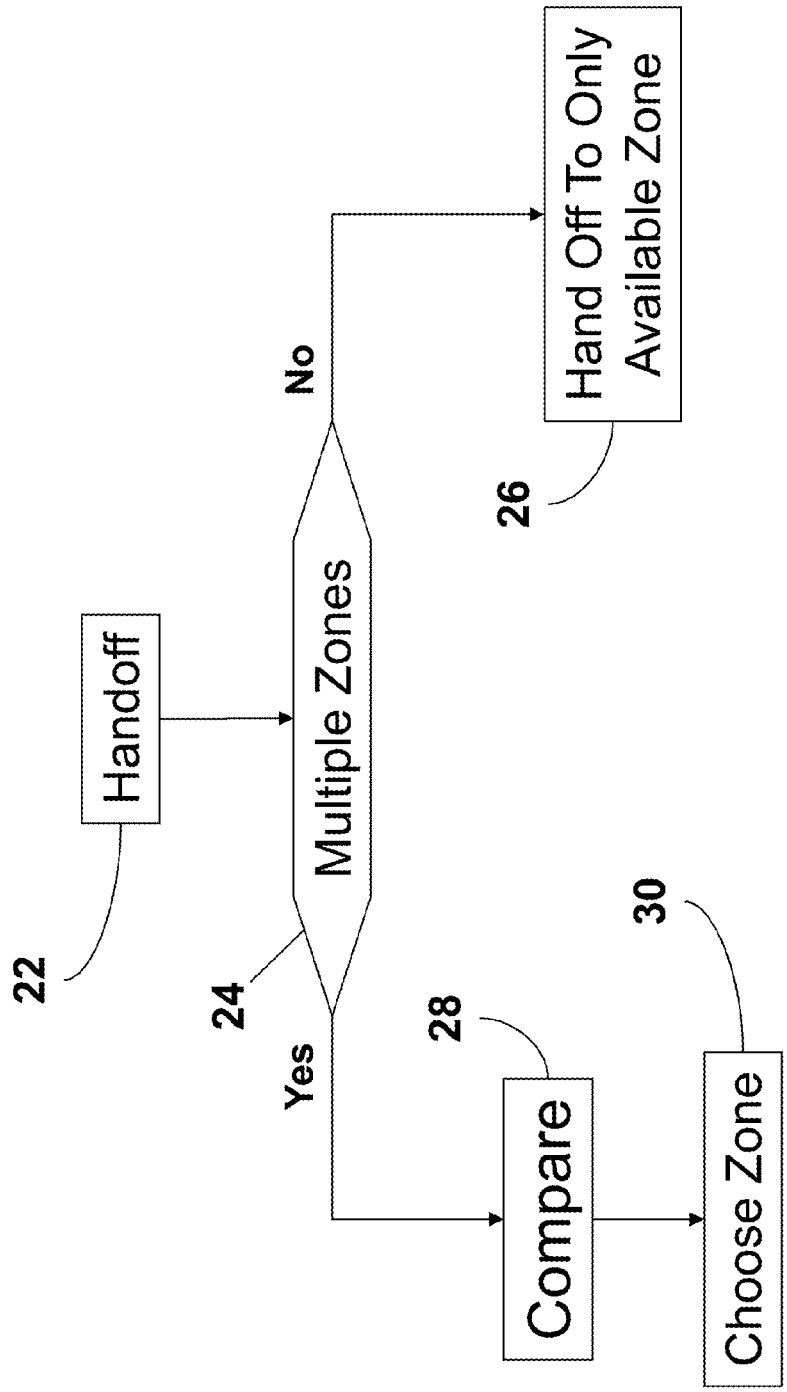
FIG. 2 is another flow diagram of an example process for regulating performance of a device utilizing a performance zone.

FIG. 2 is another flow diagram of an example process for regulating performance of a device utilizing a performance zone. When it is determined that a mobile device is to be handed off to another zone (step 22), it can be determined, at step 24, if there are multiple zones to which the mobile device can be handed off. If it is determined, at step 24 that there are not multiple zones to which the mobile device can be handed off, the mobile device is handed off to the only available zone at step 26. If it is determined, at step 24 that there are multiple zones to which the mobile device can be handed off, the color codes, and/or rules/policies of each of the multiple zones are compared at step 28. The mobile device can choose, at step 30, one of the zones to which it is to be handed off depending upon the results of the comparison and which zone has the most favorable color code and/or rules/policies.

As an example application of the process depicted in FIG. 2, revisiting the aforementioned example scenario, when the user approaches the stadium, the user's mobile device would have the choice of being handed off to one of two zones. The mobile device could be handed off to the LTE network zone or the Wi-Fi network zone. The mobile device could check the color codes and associated rules/policies for each of the two zones. For example, the mobile device could query the network for the color code for each of the LTE network zone and the Wi-Fi network zone. The color codes received in response to the query could indicate that of the current color code for the LTE network zone indicates that the amount of bandwidth available to the user is limited due to heavy usage of the LTE network (For example, due to users at the stadium streaming video of the sporting event.). The color codes received in response to the query could indicate that of the current color code for the Wi-Fi network zone does not limit the bandwidth available for use. Accordingly, the mobile device could select the Wi-Fi network zone, and implement the associated color code and rules/policies.

In an example embodiment, the mobile device could display a map and/or a list, as depicted in FIG. 3, of available zones with the color codes of each zone. As shown in FIG. 3, zone 1 could be a location at which a device could be connected to an LTE network. Zone 1 could be assigned a color code of red, indicating, among other things, that there are current bandwidth (BW) restrictions in zone 1. Zone 2 could be a location at which a device can be connected to a Wi-Fi network. Zone 2 could be assigned a color code of green, indicating, among other things, that there are no current bandwidth (BW) restrictions in zone 2. Zone 3 could be a location that may be experiencing excellent conditions and be assigned a color code of yellow, indicating, among other things, that bursts of large amounts of data are allowed. And, zone 4 could be a location experiencing average channel conditions, and thus be assigned a color code of orange, indicating, among other things, that transmission of some packets of data could be time delayed. Thus, a user of the mobile device could look at the map/list and choose a zone of his/her choice.

Figure 4:
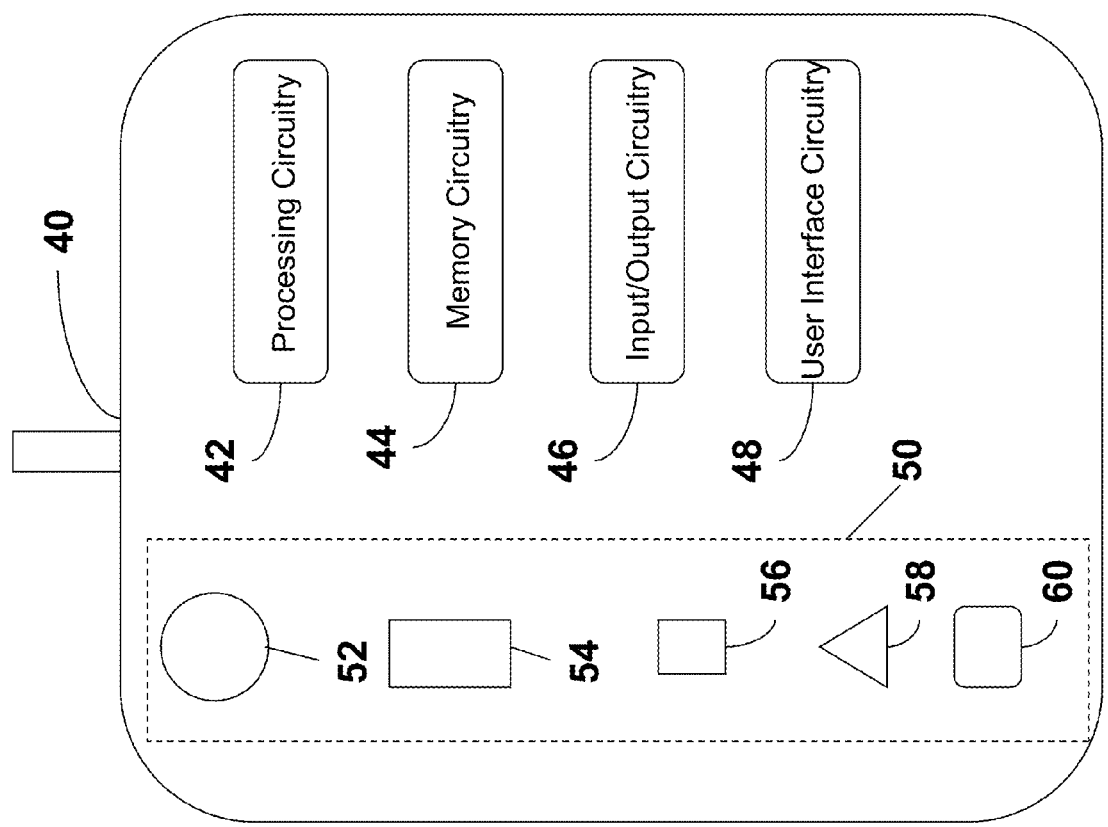
FIG. 4 is a block diagram of an example mobile device that is configurable to facilitate regulating performance of the device utilizing a performance zone as described herein.

FIG. 4 is a block diagram of an example mobile device that is configurable to facilitate regulating performance of the device utilizing a performance zone as described herein. The mobile device 40 can include any appropriate device, mechanism, software, and/or hardware for facilitating performance of the device as described herein. As described herein, the mobile device 40 comprises hardware, or a combination of hardware and software. And, each portion of the mobile device 40 comprises hardware, or a combination of hardware and software. In an example configuration, the mobile device 40 can comprise processing circuitry 42, memory circuitry 44, input/output circuitry 46, user interface (UI) circuitry 48, and sensor circuitry 50 comprising at least one of a video camera portion 52, a force/wave sensor 54, a microphone 56, a moisture sensor 58, a compass, 60, or a combination thereof. The force/wave sensor 54 can comprise at least one of a motion detector, an accelerometer, an acoustic sensor, a tilt sensor, a pressure sensor, a temperature sensor, or the like. The motion detector can be configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the mobile device, such as from a shock wave caused by broken glass or the like. The temperature sensor is capable of sensing a measuring temperature, such as inside of the vehicle, room, building, or the like. The moisture sensor 58 is capable of detecting moisture, such as detecting if the mobile device 40 is submerged in a liquid. The processing circuitry 42, memory circuitry 44, input/output circuitry 46, user interface (UI) circuitry 48, video camera portion 52, force/wave sensor 54, and microphone 56 are coupled together to allow communications therebetween (coupling not shown in FIG. 4). The mobile device 40 also can comprise a timer (not depicted in FIG. 4).

In various embodiments, the input/output circuitry 46 comprises a receiver of the mobile device 40, a transmitter of the mobile device 40, or a combination thereof. The input/output circuitry 46 is capable of, in conjunction with any other portion of the mobile device 40 as needed, receiving and/or providing information pertaining to regulating performance of the mobile device as described herein. For example, the input/output circuitry 40 can be capable of providing a query (e.g., for network conditions, for subscriber conditions, for zone information, for, for a color code associated with a zone, for a rule and/or policy associated with a color code, etc.), receiving a response to a query, or the like, or any appropriated combination thereof. The input/output circuitry 46 also is capable of communications with other devices/sensors, as described herein. For example, the input/output circuitry 46 can include a wireless communications (e.g., 2.5G/3G/4G) SIM card. The input/output circuitry 46 is capable of receiving and/or sending text information, video information, audio information, control information, image information, data, or any combination thereof. In an example embodiment, the input/output circuitry 46 is capable of receiving and/or sending information to determine a location of the mobile device 40. In an example configuration, the input\output circuitry 46 comprises a GPS receiver. In an example configuration, the mobile device 40 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 46 can receive and/or provide information via any appropriate means, such as, for example, optical means (e.g., infrared), electromagnetic means (e.g., RF, Wi-Fi, BLUETOOTH, ZIGBEE, etc.), acoustic means (e.g., speaker, microphone, ultrasonic receiver, ultrasonic transmitter), or a combination thereof. In an example configuration, the input/output portion comprises a Wi-Fi finder, a two way GPS chipset or equivalent, or the like.

The processing circuitry 42 is capable of facilitating regulating performance of the mobile device, as described herein. The processing circuitry 42, in conjunction with any other portion of the mobile device 40, can provide the ability for users/subscribers to facilitate regulating performance of the mobile device, as described herein. For example, the processing circuitry 42 can be capable of determining a performance zone, determining a color code, determining a rule and/or policy associated with a color code, determining conditions, applying a rule and/or policy, performing a comparison (e.g., of color codes, network, rules/policies, etc.), or the like, or any appropriated combination thereof. The processing circuitry 42, in conjunction with any other portion of the mobile device 40 as needed, can enable the mobile device 40 to covert speech to text when it is configured to send text messages. In an example embodiment, the processing circuitry 42, in conjunction with any other portion of the mobile device 40 as needed, can convert text to speech for rendering via the user interface circuitry 48.

In a basic configuration, the mobile device 40 can include memory circuitry 44. The memory circuitry 44 can store any information utilized in conjunction with facilitating regulating performance of the mobile device, as described herein. For example, the memory circuitry 44 can be capable of storing information pertaining to a performance zone, a color code, a rule and/or policy associated with a color code, a condition, application of a rule and/or policy (e.g., a rule book), a comparison (e.g., of color codes, network, rules/policies, etc.), or the like, or any appropriated combination thereof. Depending upon the exact configuration and type of processor, the memory circuitry 44 can be volatile (such as some types of RAM), non-volatile (such as ROM, flash memory, for example.). The mobile device 40 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory circuitry 44, or a portion of the memory circuitry 42 is hardened such that information stored therein can be recovered if the mobile device 40 is exposed to extreme heat, extreme vibration, extreme moisture, corrosive chemicals or gas, or the like. In an example configuration, the information stored in the hardened portion of the memory circuitry 44 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory circuitry 44 intelligible.

The mobile device 40 also can contain UI circuitry 48 allowing a user to communicate with the mobile device 40. The UI circuitry 48 is capable of rendering any information utilized in conjunction with the mobile device 40 to facilitate regulating performance of the mobile device, as described herein. For example, the UI circuitry 48 can provide means for entering text, entering a phone number, rendering text, rendering images, rendering multimedia, rendering sound, rendering video, receiving sound, rendering mechanical vibration, or the like, as described herein. The UI circuitry 48 can provide the ability to control the mobile device 40, via, for example, buttons, soft keys, voice actuated controls, a touch screen, movement of the mobile device 40, visual cues (e.g., moving a hand or finger in front of a camera on the mobile device 40), or the like. The UI circuitry 48 can provide visual information (e.g., via a display), audio information (e.g., via speaker), mechanically (e.g., via a vibrating mechanism), or a combination thereof. In various configurations, the UI circuitry 48 can comprise a display, a touch screen, a keyboard, a speaker, or any combination thereof. The UI circuitry 48 can comprise means for inputting biometric information, such as, for example, fingerprint information, retinal information, voice information, and/or facial characteristic information. The UI circuitry 48 can be utilized to enter an indication of the designated destination (e.g., the phone number, IP address, geographic information, or the like).

In an example embodiment, the sensor circuitry 50 of the mobile device 40 comprises a video camera portion 52, a force/wave sensor 54, and a microphone 56. The video camera portion 52 comprises a camera (or cameras) and associated equipment capable of capturing still images and/or video and to provide the captured still images and/or video to other portions of the mobile device 40. In an example embodiment, the force/wave sensor 54 comprises an accelerometer, a tilt sensor, an acoustic sensor capable of sensing acoustic energy, an optical sensor (e.g., infrared), or any combination thereof.

Figure 5:
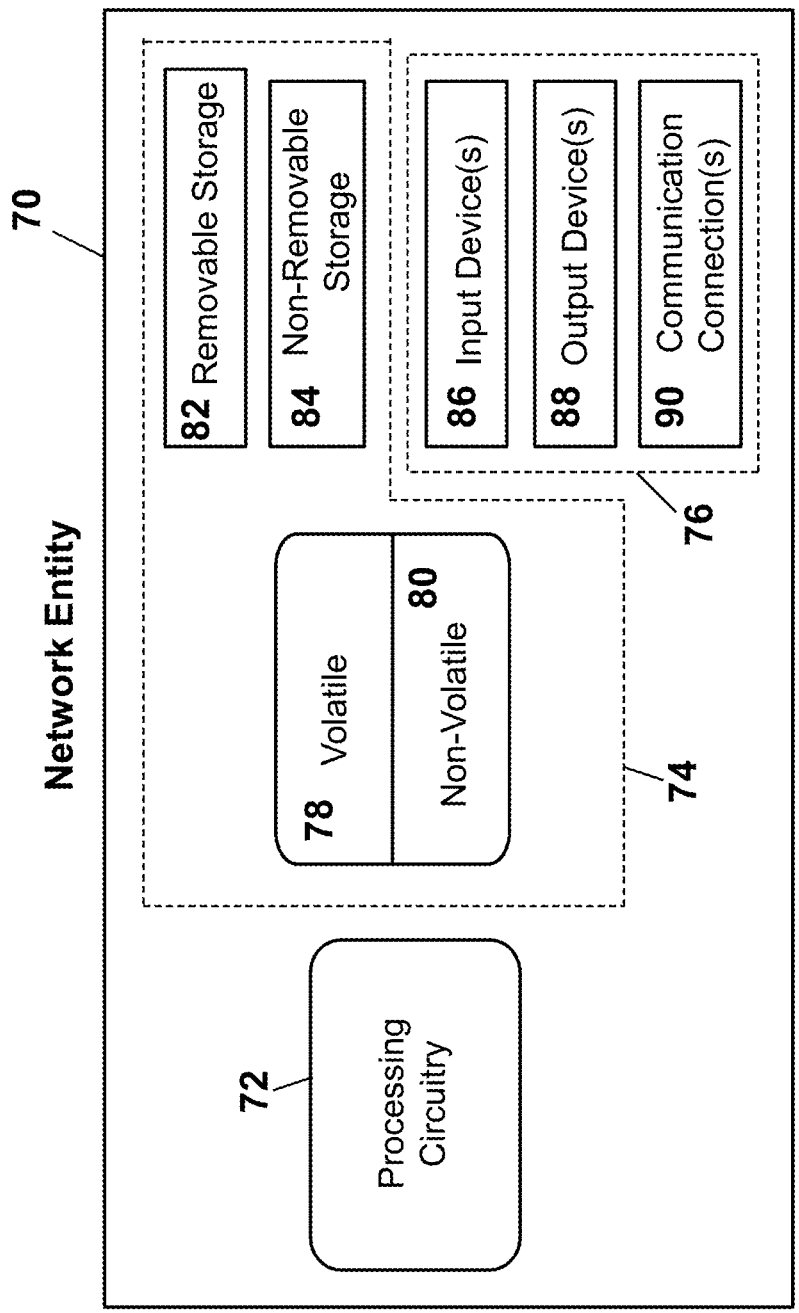
FIG. 5 is a block diagram of an example network entity 70 configurable to facilitate regulating performance of a device utilizing a performance zone.

FIG. 5 is a block diagram of an example network entity 70 configurable to facilitate regulating performance of a device utilizing a performance zone. The network entity 70 depicted in FIG. 5 represents any appropriate network entity, apparatus, or combination of network entities or apparatuses, such as a processor, a server, a gateway, any network entity depicted in FIG. 6, FIG. 7, FIG. 8, FIG. 9, FIG. 10, and/or FIG. 12, etc., or any combination thereof. In an example embodiment, the network entity 70 comprises hardware, or a combination of hardware and software. And, each portion of the network entity 70 comprises hardware, or a combination of hardware and software. When used in conjunction with a network, the functionality needed to facilitate regulating performance of a device can reside in any one or combination of network entities. It is emphasized that the block diagram depicted in FIG. 5 is an example and not intended to imply a specific implementation or configuration. Thus, the network entity 70 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 70 comprises processing circuitry 72, memory circuitry 74, and input/output circuitry 76. The processing circuitry 72, memory circuitry 74, and input/output circuitry 76 are coupled together (coupling not shown in FIG. 5) to allow communications therebetween. The input/output circuitry 76 is capable of receiving and/or providing information from/to a device (e.g., mobile device 40) and/or any other network entity and/or entities configurable to be utilized to facilitate regulating performance of the mobile device. For example, the input/output circuitry 76 may be capable of, in conjunction with any other portion of the network entity 70 as needed, providing and/or receiving information pertaining to: a zone, a color code, rules/policies, network conditions, changes in network conditions, subscriber related conditions, or the like, or any combination thereof.

The processing circuitry 72 may be capable of performing functions associated with facilitating regulating performance of a device, as described herein. For example, the processing circuitry 72 can be capable of determining a performance zone, determining a color code, determining a rule and/or policy associated with a color code, determining conditions, applying a rule and/or policy, performing a comparison (e.g., of color codes, network, rules/policies, etc.), or the like, or any appropriated combination thereof.

The memory circuitry 74 can store any information utilized in conjunction with dynamic voice based emergency notification, as described herein. For example, the memory portion 74 may be capable of storing information pertaining to a performance zone, a color code, a rule and/or policy associated with a color code, a condition, application of a rule and/or policy (e.g., a rule book), a comparison (e.g., of color codes, network, rules/policies, etc.), or the like, or any appropriated combination thereof. Depending upon the exact configuration and type of network entity 70, the memory circuitry 74 can include a computer storage medium, or media, that is volatile 78 (such as dynamic RAM), non-volatile 80 (such as ROM), or a combination thereof. The network entity 70 can include additional storage, in the form of computer storage media (e.g., removable storage 82 and/or non-removable storage 84) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture and not a transient signal.

The network entity 70 also can contain communications connection(s) 90 that allow the network entity 70 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The network entity 70 also can include input device(s) 86 such as keyboard, mouse, pen, voice input device, touch input device, an optical input device, etc. Output device(s) 88 such as a display, speakers, printer, mechanical vibrators, etc. also can be included.

A mobile device (e.g., mobile device 40) and the network entity (e.g., network entity 70) can be part of and/or in communication with various wireless communications networks. Some of which are described below.

Figure 6:
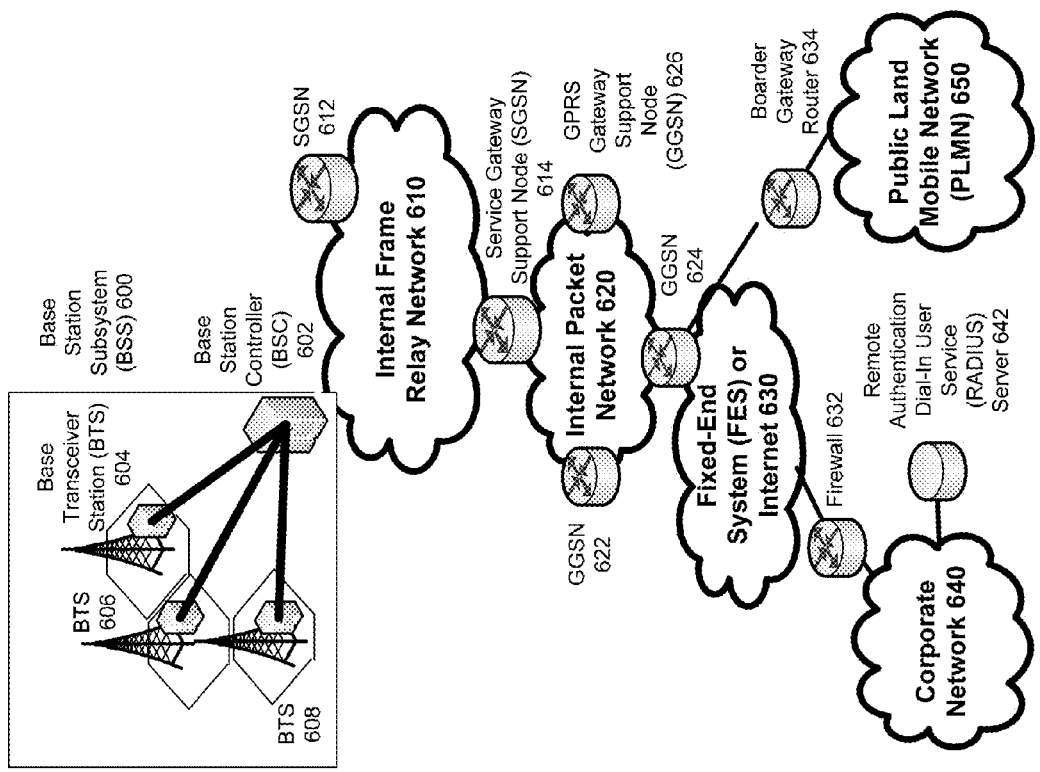
FIG. 6 depicts an overall block diagram of an example packet-based mobile cellular network environment, such as a GPRS network, within which performance regulation of a device utilizing a performance zone can be implemented.

FIG. 6 depicts an overall block diagram of an example packet-based mobile cellular network environment, such as a GPRS network, within which performance regulation of a device utilizing a performance zone can be implemented. In the example packet-based mobile cellular network environment shown in FIG. 6, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network. In example fashion, the packet traffic originating from user devices is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 7:
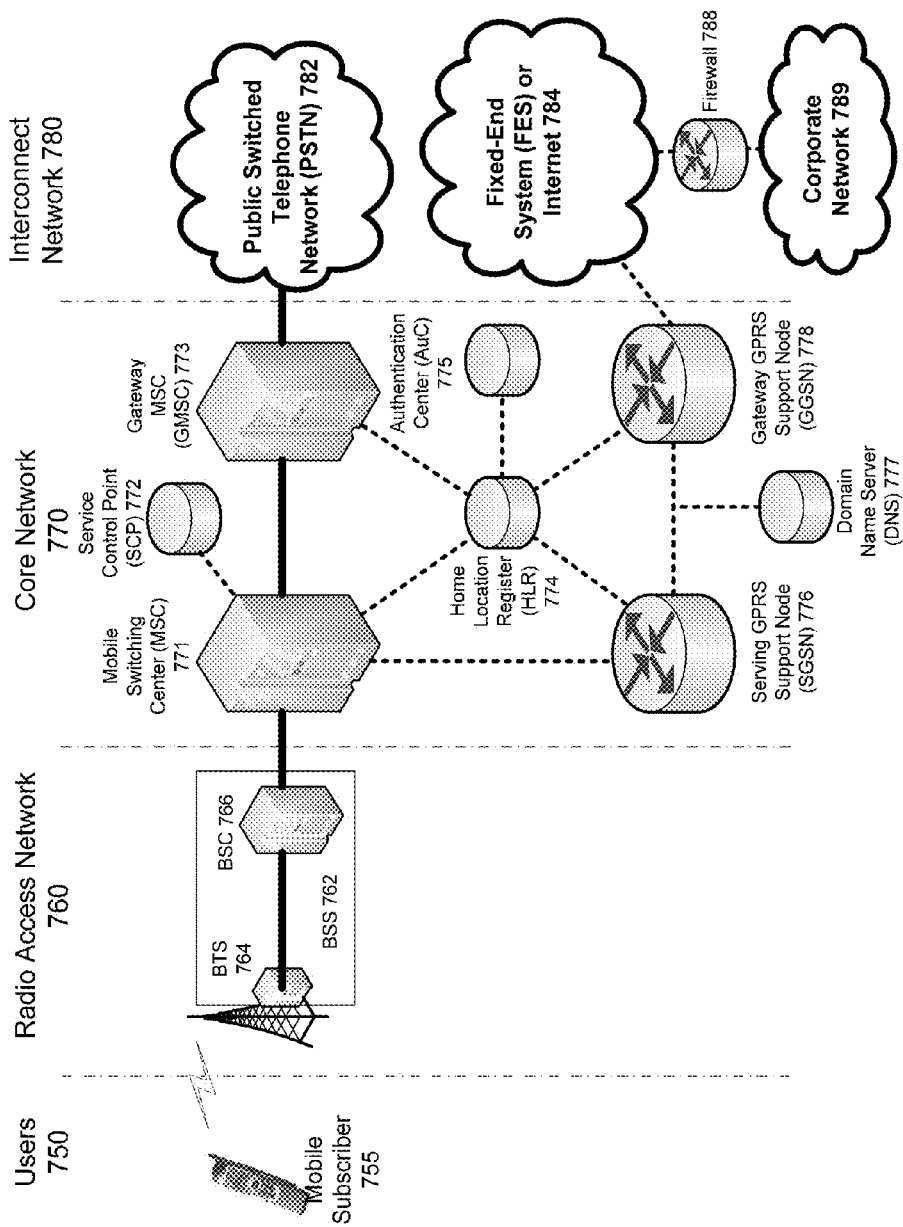
FIG. 7 illustrates an architecture of a typical GPRS network within which performance regulation of a device utilizing a performance zone can be implemented.

FIG. 7 illustrates an architecture of a typical GPRS network within which performance regulation of a device utilizing a performance zone can be implemented. The architecture depicted in FIG. 7 is segmented into four groups: users 750, radio access network 760, core network 770, and interconnect network 780. Users 750 comprise a plurality of end users. Note, device 712 is referred to as a mobile subscriber in the description of network shown in FIG. 7. In an example embodiment, the device depicted as mobile subscriber 712 comprises a communications device (e.g., device/sensor 70). Radio access network 760 comprises a plurality of base station subsystems such as BSSs 762, which include BTSs 764 and BSCs 766. Core network 770 comprises a host of various network elements. As illustrated in FIG. 7, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 7, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 7, when mobile subscriber 712 initiates the attach process by turning on the network capabilities of the mobile device, an attach request is sent by mobile subscriber 712 to SGSN 776. The SGSN 776 queries another SGSN, to which mobile subscriber 712 was attached before, for the identity of mobile subscriber 712. Upon receiving the identity of mobile subscriber 712 from the other SGSN, SGSN 776 requests more information from mobile subscriber 712. This information is used to authenticate mobile subscriber 712 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 712 was attached before, to cancel the location process for mobile subscriber 712. HLR 774 then notifies SGSN 776 that the location update has been performed. At this time, SGSN 776 sends an Attach Accept message to mobile subscriber 712, which in turn sends an Attach Complete message to SGSN 776.

After attaching itself with the network, mobile subscriber 712 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 712. The mobile subscriber 712 uses an algorithm to send the user identification (ID) and password to SGSN 776. The SGSN 776 uses the same algorithm and compares the result. If a match occurs, SGSN 776 authenticates mobile subscriber 712.

Next, the mobile subscriber 712 establishes a user session with the destination network, corporate network 789, by going through a Packet Data Protocol ("PDP") activation process. Briefly, in the process, mobile subscriber 712 requests access to the Access Point Name ("APN"), for example, UPS.com, and SGSN 776 receives the activation request from mobile subscriber 712. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 712.

Once activated, data packets of the call made by mobile subscriber 712 can then go through radio access network 760, core network 770, and interconnect network 780, in a particular fixed-end system or Internet 784 and firewall 788, to reach corporate network 789.

Figure 8:
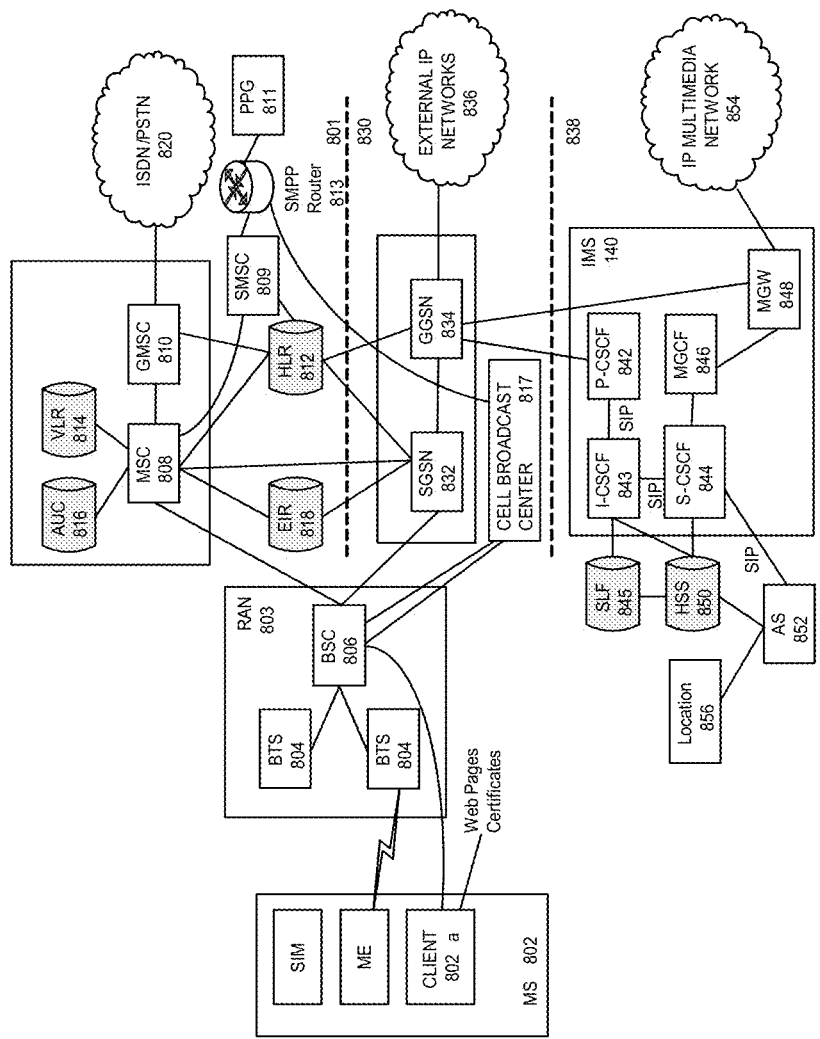
FIG. 8 illustrates an example block diagram view of a GSM/GPRS/IP multimedia network architecture within which performance regulation of a device utilizing a performance zone can be implemented.

FIG. 8 illustrates an example block diagram view of a GSM/GPRS/IP multimedia network architecture within which performance regulation of a device utilizing a performance zone can be implemented. As illustrated, the architecture of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 817 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 9:
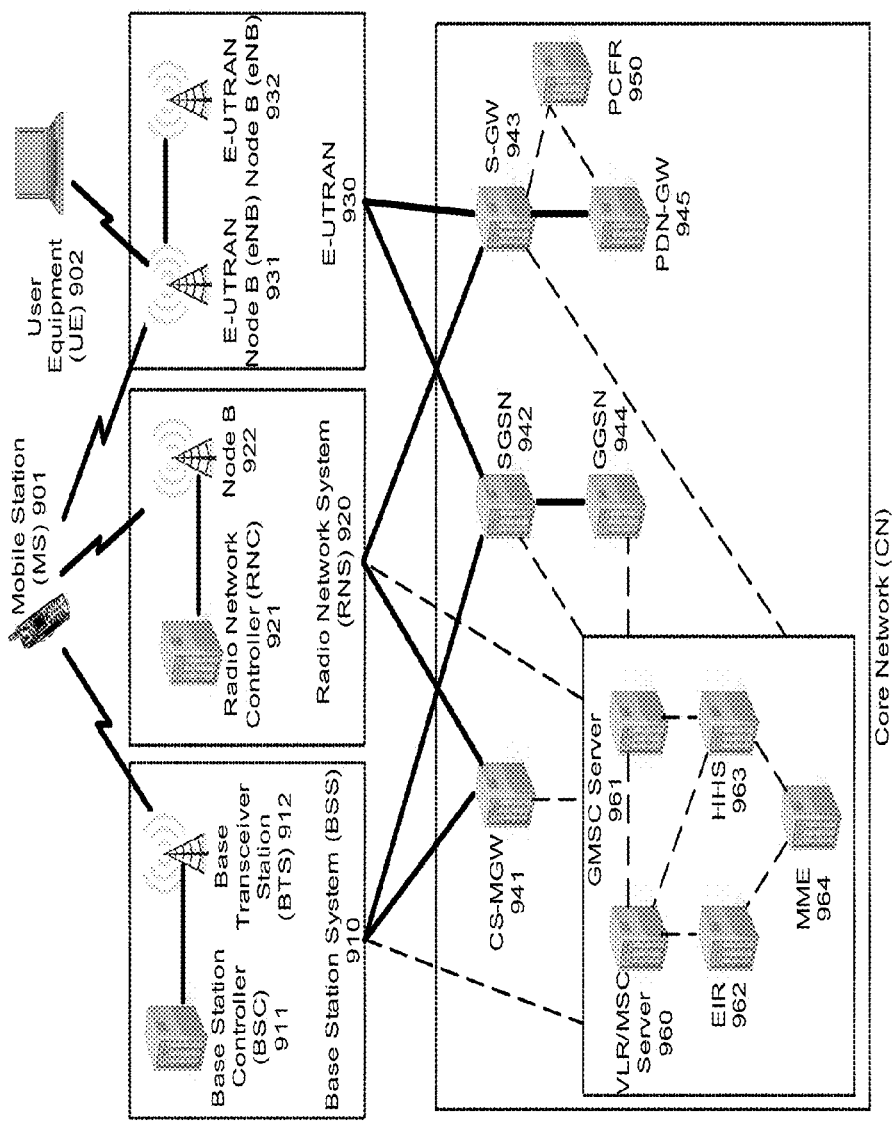
FIG. 9 illustrates a PLMN block diagram view of an example architecture in which performance regulation of a device utilizing a performance zone may be incorporated.

FIG. 9 illustrates a PLMN block diagram view of an example architecture in which performance regulation of a device utilizing a performance zone may be incorporated. Mobile Station (MS) 901 is the physical equipment used by the PLMN subscriber. In one illustrative embodiment, communications device 200 may serve as Mobile Station 901. Mobile Station 901 may be one of, but not limited to, a cellular telephone, a cellular telephone in combination with another electronic device or any other wireless mobile communication device.

Mobile Station 901 may communicate wirelessly with Base Station System (BSS) 910. BSS 910 contains a Base Station Controller (BSC) 911 and a Base Transceiver Station (BTS) 912. BSS 910 may include a single BSC 911/BTS 912 pair (Base Station) or a system of BSC/BTS pairs which are part of a larger network. BSS 910 is responsible for communicating with Mobile Station 901 and may support one or more cells. BSS 910 is responsible for handling cellular traffic and signaling between Mobile Station 901 and Core Network 940. Typically, BSS 910 performs functions that include, but are not limited to, digital conversion of speech channels, allocation of channels to mobile devices, paging, and transmission/reception of cellular signals.

Additionally, Mobile Station 901 may communicate wirelessly with Radio Network System (RNS) 920. RNS 920 contains a Radio Network Controller (RNC) 921 and one or more Node(s) B 922. RNS 920 may support one or more cells. RNS 920 may also include one or more RNC 921/Node B 922 pairs or alternatively a single RNC 921 may manage multiple Nodes B 922. RNS 920 is responsible for communicating with Mobile Station 901 in its geographically defined area. RNC 921 is responsible for controlling the Node(s) B 922 that are connected to it and is a control element in a UMTS radio access network. RNC 921 performs functions such as, but not limited to, load control, packet scheduling, handover control, security functions, as well as controlling Mobile Station 901's access to the Core Network (CN) 940.

The evolved UMTS Terrestrial Radio Access Network (E-UTRAN) 930 is a radio access network that provides wireless data communications for Mobile Station 901 and User Equipment 902. E-UTRAN 930 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 930 may include of series of logical network components such as E-UTRAN Node B (eNB) 931 and E-UTRAN Node B (eNB) 932. E-UTRAN 930 may contain one or more eNBs. User Equipment 902 may be any user device capable of connecting to E-UTRAN 930 including, but not limited to, a personal computer, laptop, mobile device, wireless router, or other device capable of wireless connectivity to E-UTRAN 930. The improved performance of the E-UTRAN 930 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 901 may communicate with any or all of BSS 910, RNS 920, or E-UTRAN 930. In a illustrative system, each of BSS 910, RNS 920, and E-UTRAN 930 may provide Mobile Station 901 with access to Core Network 940. The Core Network 940 may include of a series of devices that route data and communications between end users. Core Network 940 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 941 is part of Core Network 940, and interacts with Visitor Location Register (VLR) and Mobile-Services Switching Center (MSC) Server 960 and Gateway MSC Server 961 in order to facilitate Core Network 940 resource control in the CS domain. Functions of CS-MGW 941 include, but are not limited to, media conversion, bearer control, payload processing and other mobile network processing such as handover or anchoring. CS-MGW 940 may receive connections to Mobile Station 901 through BSS 910, RNS 920 or both.

Serving GPRS Support Node (SGSN) 942 stores subscriber data regarding Mobile Station 901 in order to facilitate network functionality. SGSN 942 may store subscription information such as, but not limited to, the International Mobile Subscriber Identity (IMSI), temporary identities, or Packet Data Protocol (PDP) addresses. SGSN 942 may also store location information such as, but not limited to, the Gateway GPRS Support Node (GGSN) 944 address for each GGSN where an active PDP exists. GGSN 944 may implement a location register function to store subscriber data it receives from SGSN 942 such as subscription or location information.

Serving Gateway (S-GW) 943 is an interface which provides connectivity between E-UTRAN 930 and Core Network 940. Functions of S-GW 943 include, but are not limited to, packet routing, packet forwarding, transport level packet processing, event reporting to Policy and Charging Rules Function (PCRF) 950, and mobility anchoring for inter-network mobility. PCRF 950 uses information gathered from S-GW 943, as well as other sources, to make applicable policy and charging decisions related to data flows, network resources and other network administration functions. Packet Data Network Gateway (PDN-GW) 945 may provide user-to-services connectivity functionality including, but not limited to, network-wide mobility anchoring, bearer session anchoring and control, and IP address allocation for PS domain connections.

Home Subscriber Server (HSS) 963 is a database for user information, and stores subscription data regarding Mobile Station 901 or User Equipment 902 for handling calls or data sessions. Networks may contain one HSS 963 or more if additional resources are required. Example data stored by HSS 963 include, but is not limited to, user identification, numbering and addressing information, security information, or location information. HSS 963 may also provide call or session establishment procedures in both the PS and CS domains.

The VLR/MSC Server 960 provides user location functionality. When Mobile Station 901 enters a new network location, it begins a registration procedure. A MSC Server for that location transfers the location information to the VLR for the area. A VLR and MSC Server may be located in the same computing environment, as is shown by VLR/MSC Server 960, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 901 registration or procedures for handover of Mobile Station 901 to a different section of the Core Network 940. GMSC Server 961 may serve as a connection to alternate GMSC Servers for other mobile stations in larger networks.

Equipment Identity Register (EIR) 962 is a logical element which may store the International Mobile Equipment Identities (IMEI) for Mobile Station 901. In a typical embodiment, user equipment may be classified as either "white listed" or "black listed" depending on its status in the network. In one embodiment, if Mobile Station 901 is stolen and put to use by an unauthorized user, it may be registered as "black listed" in EIR 962, preventing its use on the network. Mobility Management Entity (MME) 964 is a control node which may track Mobile Station 901 or User Equipment 902 if the devices are idle. Additional functionality may include the ability of MME 964 to contact an idle Mobile Station 901 or User Equipment 902 if retransmission of a previous session is required.

Figure 10:
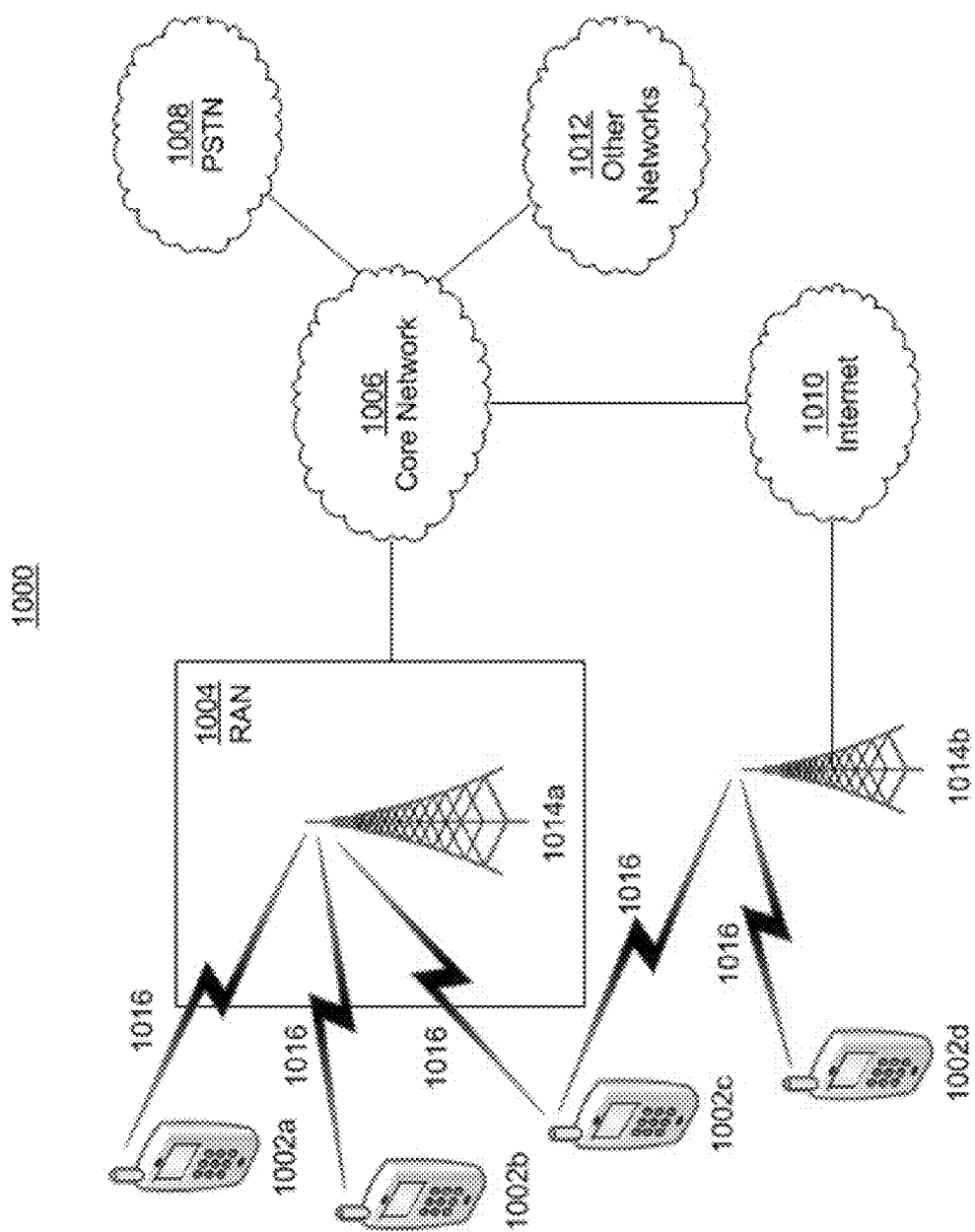
FIG. 10 is a system diagram of an example communications system in which one or more disclosed embodiments may be implemented.

FIG. 10 is a diagram of an example communications system 1000 in which one or more disclosed embodiments may be implemented. The communications system 1000 may be a multiple access system that provides content, such as voice, data, video, messaging, broadcast, etc., to multiple wireless users. The communications system 1000 may enable multiple wireless users to access such content through the sharing of system resources, including wireless bandwidth. For example, the communications system 1000 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 10 may also be referred to herein as a network.

As shown in FIG. 10, the communications system 1000 may include wireless transmit/receive units (WTRUs) 1002*a*, 1002*b*, 1002*c*, 1002*d*, a radio access network (RAN) 1004, a core network 1006, a public switched telephone network (PSTN) 1008, the Internet 1010, and other networks 1012, though it will be appreciated that the disclosed embodiments contemplate any number of WTRUs, base stations, networks, and/or network elements. Each of the WTRUs 1002*a*, 1002*b*, 1002*c*, 1002*d* may be any type of device configured to operate and/or communicate in a wireless environment, such as, for example, a mobile device 40 of FIG. 4. By way of example, the WTRUs 1002*a*, 1002*b*, 1002*c*, 1002*d* may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, home electronics, automobile electronics, medical electronics, or the like.

The communications system 1000 may also include a base station 1014*a* and a base station 1014*b*. Each of the base stations 1014*a*, 1014*b* may be any type of device configured to wirelessly interface with at least one of the WTRUs 1002*a*, 1002*b*, 1002*c*, 1002*d* to facilitate access to one or more communication networks, such as the core network 1006, the Internet 1010, and/or the networks 1012. By way of example, the base stations 1014*a*, 1014*b* may be a base transceiver station (BTS), a Node B, an eNode B, a Home Node B, a Home eNode B, a site controller, an access point (AP), a wireless router, and the like. While the base stations 1014*a*, 1014*b* are each depicted as a single element, it will be appreciated that the base stations 1014*a*, 1014*b* may include any number of interconnected base stations and/or network elements.

The base station 1014*a* may be part of the RAN 1004, which may also include other base stations and/or network elements (not shown), such as a base station controller (BSC), a radio network controller (RNC), relay nodes, etc. The base station 1014*a* and/or the base station 1014*b* may be configured to transmit and/or receive wireless signals within a particular geographic region, which may be referred to as a cell (not shown). The cell may further be divided into cell sectors. For example, the cell associated with the base station 1014*a* may be divided into three sectors. Thus, in an embodiment, the base station 1014*a* may include three transceivers, i.e., one for each sector of the cell. In another embodiment, the base station 1014*a* may employ multiple-input multiple output (MIMO) technology and, therefore, may utilize multiple transceivers for each sector of the cell.

The base stations 1014*a*, 1014*b* may communicate with one or more of the WTRUs 1002*a*, 1002*b*, 1002*c*, 1002*d* over an air interface 1016, which may be any suitable wireless communication link (e.g., radio frequency (RF), microwave, infrared (IR), ultraviolet (UV), visible light, etc.). The air interface 1016 may be established using any suitable radio access technology (RAT).

More specifically, as noted above, the communications system 1000 may be a multiple access system and may employ one or more channel access schemes, such as CDMA, TDMA, FDMA, OFDMA, SC-FDMA, and the like. For example, the base station 1014*a* in the RAN 1004 and the WTRUs 1002*a*, 1002*b*, 1002*c* may implement a radio technology such as Universal Mobile Telecommunications System (UMTS) Terrestrial Radio Access (UTRA) that may establish the air interface 1016 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1014*a* and the WTRUs 1002*a*, 1002*b*, 1002*c* may implement a radio technology such as Evolved UMTS Terrestrial Radio Access (E-UTRA), which may establish the air interface 1016 using Long Term Evolution (LTE) and/or LTE-Advanced (LTE-A).

In other embodiments, the base station 1014*a* and the WTRUs 1002*a*, 1002*b*, 1002*c* may implement radio technologies such as IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1014b in FIG. 10 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1014b and the WTRUs 1002c, 1002d may implement a radio technology such as IEEE 802.11 to establish a wireless local area network (WLAN). In another embodiment, the base station 1014b and the WTRUs 1002c, 1002d may implement a radio technology such as IEEE 802.15 to establish a wireless personal area network (WPAN). In yet another embodiment, the base station 1014b and the WTRUs 1002c, 1002d may utilize a cellular-based RAT (e.g., WCDMA, CDMA2000, GSM, LTE, LTE-A, etc.) to establish a picocell or femtocell. As shown in FIG. 10, the base station 1014b may have a direct connection to the Internet 1010. Thus, the base station 1014b may not be required to access the Internet 1010 via the core network 1006.

The RAN 1004 may be in communication with the core network 1006, which may be any type of network configured to provide voice, data, applications, and/or voice over internet protocol (VoIP) services to one or more of the WTRUs 1002a, 1002b, 1002c, 1002d. For example, the core network 1006 may provide call control, billing services, mobile location-based services, pre-paid calling, Internet connectivity, video distribution, etc., and/or perform high-level security functions, such as user authentication. Although not shown in FIG. 10, it will be appreciated that the RAN 1004 and/or the core network 106 may be in direct or indirect communication with other RANs that employ the same RAT as the RAN 1004 or a different RAT. For example, in addition to being connected to the RAN 1004, which may be utilizing an E-UTRA radio technology, the core network 106 may also be in communication with another RAN (not shown) employing a GSM radio technology.

The core network 1006 may also serve as a gateway for the WTRUs 1002a, 1002b, 1002c, 1002d to access the PSTN 1008, the Internet 1010, and/or other networks 1012. The PSTN 1008 may include circuit-switched telephone networks that provide plain old telephone service (POTS). The Internet 1010 may include a global system of interconnected computer networks and devices that use common communication protocols, such as the transmission control protocol (TCP), user datagram protocol (UDP) and the internet protocol (IP) in the TCP/IP internet protocol suite. The networks 1012 may include wired or wireless communications networks owned and/or operated by other service providers. For example, the networks 1012 may include another core network connected to one or more RANs, which may employ the same RAT as the RAN 1004 or a different RAT.

Some or all of the WTRUs 1002a, 1002b, 1002c, 1002d in the communications system 1000 may include multi-mode capabilities, i.e., the WTRUs 1002a, 1002b, 1002c, 1002d may include multiple transceivers for communicating with different wireless networks over different wireless links. For example, the WTRU 1002c shown in FIG. 10 may be configured to communicate with the base station 1014a, which may employ a cellular-based radio technology, and with the base station 1014b, which may employ an IEEE 802 radio technology.

Figure 11:
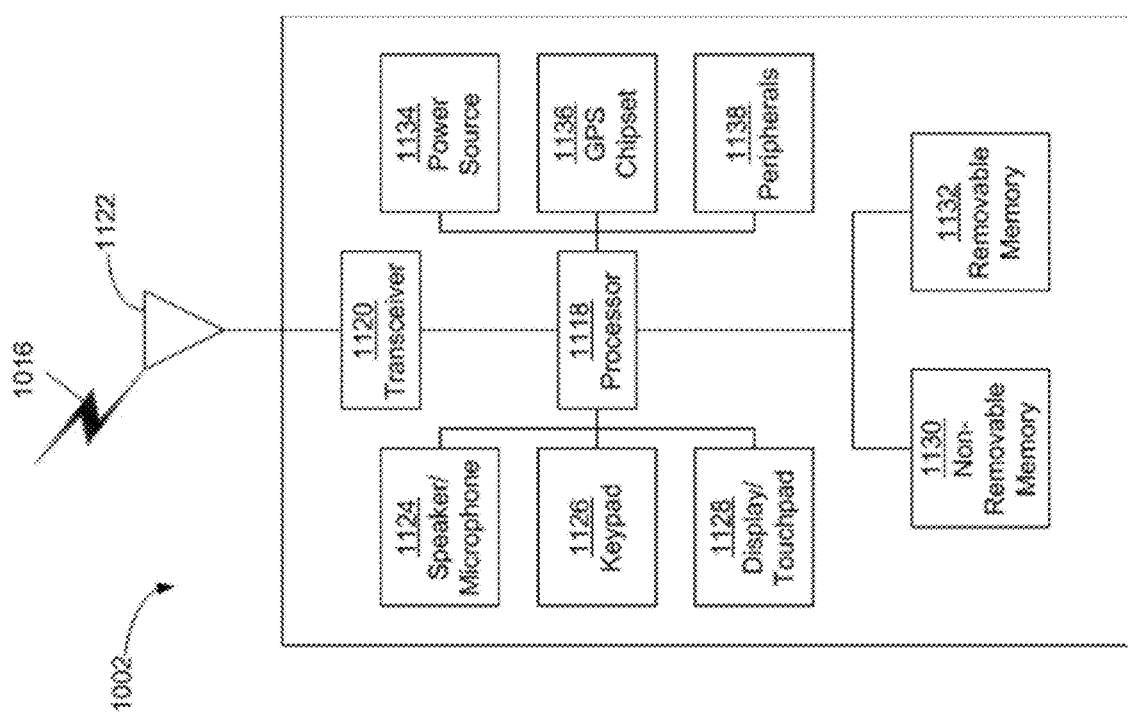
FIG. 11 is a system diagram of an example mobile device (also referred to as a wireless transmit/receive unit (WTRU) and/or as user equipment (UE)) that may be used within the communications system illustrated in FIG. 10.

FIG. 11 is a system diagram of an example WTRU 1002. As shown in FIG. 11, the WTRU 1002 may include a processor 1118, a transceiver 1120, a transmit/receive element 1122, a speaker/microphone 1124, a keypad 1126, a display/touchpad 1128, non-removable memory 1130, removable memory 1132, a power source 1134, a global positioning system (GPS) chipset 1136, and other peripherals 1138. It will be appreciated that the WTRU 1002 may include any sub-combination of the foregoing elements while remaining consistent with an embodiment. The WTRU 1002 may comprise any appropriate portion or portions of example mobile device 40 of FIG. 4.

The processor 1118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 1118 may include circuitry and other components that enable processor 1118 to perform any of the functions and methods described herein. Such circuitry and other components may also enable processor 1118 to communicate and/or interact with other devices and components, for example any other component of device of WTRU 1002, in such a manner as to enable processor 1118 and such other devices and/or components to perform any of the disclosed functions and methods. The processor 1118 may perform signal coding, data processing, power control, input/output processing, and/or any other functionality that enables the WTRU 1002 to operate in a wireless environment. The processor 1118 may be coupled to the transceiver 1120, which may be coupled to the transmit/receive element 1122. While FIG. 11 depicts the processor 1118 and the transceiver 1120 as separate components, it will be appreciated that the processor 1118 and the transceiver 1120 may be integrated together in an electronic package or chip.

The transmit/receive element 1122 may be configured to transmit signals to, or receive signals from, a base station (e.g., the base station 1014a) over the air interface 1016. For example, in one embodiment, the transmit/receive element 1122 may be an antenna configured to transmit and/or receive RF signals. In another embodiment, the transmit/receive element 1122 may be an emitter/detector configured to transmit and/or receive IR, UV, or visible light signals, for example. In yet another embodiment, the transmit/receive element 1122 may be configured to transmit and receive both RF and light signals. It will be appreciated that the transmit/receive element 1122 may be configured to transmit and/or receive any combination of wireless signals.

In addition, although the transmit/receive element 1122 is depicted in FIG. 11 as a single element, the WTRU 1002 may include any number of transmit/receive elements 1122. More specifically, the WTRU 1002 may employ MIMO technology. Thus, in one embodiment, the WTRU 1002 may include two or more transmit/receive elements 1122 (e.g., multiple antennas) for transmitting and receiving wireless signals over the air interface 1016.

The transceiver 1120 may be configured to modulate the signals that are to be transmitted by the transmit/receive element 1122 and to demodulate the signals that are received by the transmit/receive element 1122. As noted above, the WTRU 1002 may have multi-mode capabilities. Thus, the transceiver 1120 may include multiple transceivers for enabling the WTRU 1002 to communicate via multiple RATs, such as UTRA and IEEE 802.11, for example.

The processor 1118 of the WTRU 1002 may be coupled to, and may receive user input data from, the speaker/microphone 1124, the keypad 1126, and/or the display/touchpad 1128 (e.g., a liquid crystal display (LCD) display unit or organic light-emitting diode (OLED) display unit). The processor 1118 may also output user data to the speaker/microphone 1124, the keypad 1126, and/or the display/touchpad 1128. In addition, the processor 1118 may access information from, and store data in, any type of suitable memory, such as the non-removable memory 1130 and/or the removable memory 1132. The non-removable memory 1130 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, the processor 1118 may access information from, and store data in, memory that is not physically located on the WTRU 1002, such as on a server or a home computer (not shown).

The processor 1118 may receive power from the power source 1134, and may be configured to distribute and/or control the power to the other components in the WTRU 1002. The power source 1134 may be any suitable device for powering the WTRU 1002. For example, the power source 1134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1118 may also be coupled to the GPS chipset 1136, which may be configured to provide location information (e.g., longitude and latitude) regarding the current location of the WTRU 1002. In addition to, or in lieu of, the information from the GPS chipset 1136, the WTRU 1002 may receive location information over the air interface 1016 from a base station (e.g., base stations 1014a, 1014b) and/or determine its location based on the timing of the signals being received from two or more nearby base stations. It will be appreciated that the WTRU 1002 may acquire location information by way of any suitable location-determination method while remaining consistent with an embodiment.

The processor 1118 may further be coupled to other peripherals 1138, which may include one or more software and/or hardware modules that provide additional features, functionality and/or wired or wireless connectivity. For example, the peripherals 1138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12:
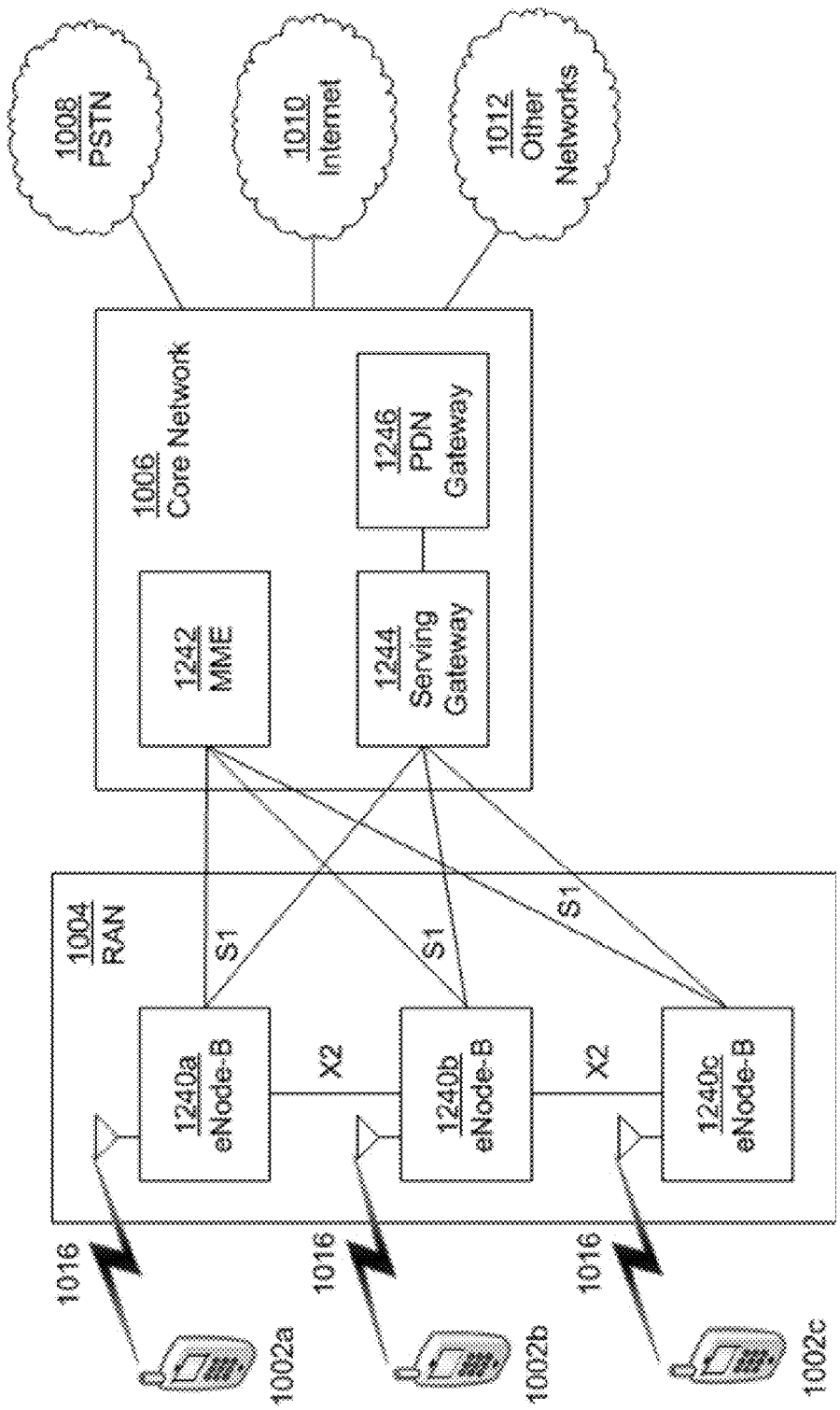
FIG. 12 is a system diagram of an example radio access network and an example core network that may be used within the communications system illustrated in FIG. 10.

FIG. 12 is an example system diagram of the RAN 1004 and the core network 106 according to an embodiment. As noted above, the RAN 1004 may employ an E-UTRA radio technology to communicate with the WTRUs 1002a, 1002b, and 1002c over the air interface 1016. The RAN 1004 may also be in communication with the core network 1006.

The RAN 1004 may include eNode-Bs 1240a, 1240b, 1240c, though it will be appreciated that the RAN 1004 may include any number of eNode-Bs while remaining consistent with an embodiment. The eNode-Bs 1240a, 1240b, 1240c may each include one or more transceivers for communicating with the WTRUs 1002a, 1002b, 1002c over the air interface 1016. In one embodiment, the eNode-Bs 1240a, 1240b, 1240c may implement MIMO technology. Thus, the eNode-B 1240a, for example, may use multiple antennas to transmit wireless signals to, and receive wireless signals from, the WTRU 1002a.

Each of the eNode-Bs 1240a, 1240b, and 1240c may be associated with a particular cell (not shown) and may be configured to handle radio resource management decisions, handover decisions, scheduling of users in the uplink and/or downlink, and the like. As shown in FIG. 12, the eNode-Bs 1240a, 1240b, 1240c may communicate with one another over an X2 interface.

The core network 1006 shown in FIG. 12 may include a mobility management gateway or entity (MME) 1242, a serving gateway 1244, and a packet data network (PDN) gateway 1246. While each of the foregoing elements are depicted as part of the core network 106, it will be appreciated that any one of these elements may be owned and/or operated by an entity other than the core network operator.

The MME 1242 may be connected to each of the eNode-Bs 1242a, 1242b, 1242c in the RAN 1004 via an S1 interface and may serve as a control node. For example, the MME 1242 may be responsible for authenticating users of the WTRUs 1002a, 1002b, 1002c, bearer activation/deactivation, selecting a particular serving gateway during an initial attach of the WTRUs 1002a, 1002b, 1002c, and the like. The MME 1242 may also provide a control plane function for switching between the RAN 1004 and other RANs (not shown) that employ other radio technologies, such as GSM or WCDMA.

The serving gateway 1244 may be connected to each of the eNode Bs 1240a, 1240b, and 1240c in the RAN 1004 via the S1 interface. The serving gateway 1244 may generally route and forward user data packets to/from the WTRUs 1002a, 1002b, 1002c. The serving gateway 1244 may also perform other functions, such as anchoring user planes during inter-eNode B handovers, triggering paging when downlink data is available for the WTRUs 1002a, 1002b, 1002c, managing and storing contexts of the WTRUs 1002a, 1002b, 1002c, and the like.

The serving gateway 1244 may also be connected to the PDN gateway 1246, which may provide the WTRUs 1002a, 1002b, 1002c with access to packet-switched networks, such as the Internet 110, to facilitate communications between the WTRUs 1002a, 1002b, 1002c and IP-enabled devices.

The core network 106 may facilitate communications with other networks. For example, the core network 106 may provide the WTRUs 1002a, 1002b, 1002c with access to circuit-switched networks, such as the PSTN 108, to facilitate communications between the WTRUs 1002a, 1002b, 1002c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 1002a, 1002b, 1002c with access to the networks 112, which may include other wired or wireless networks that are owned and/or operated by other service providers.

While example embodiments of performance regulation of a device utilizing a performance zone have been described in connection with various computing devices/processors, the underlying concepts can be applied to any computing device, processor, or system capable of regulating performance of a device utilizing a performance zone as described herein. The various techniques described herein can be implemented in connection with hardware or software or, where appropriate, with a combination of both. Thus, the methods and apparatuses for implementing performance regulation of a device utilizing a performance zone, or certain aspects or portions thereof, can utilize program code (i.e., instructions) embodied in tangible storage media having a tangible physical structure. Examples of tangible storage media include floppy diskettes, CD-ROMs, DVDs, hard drives, or any other tangible machine-readable storage medium (tangible computer-readable storage medium). Thus, a tangible storage medium as described herein is not a transient propagating signal. When the program code is loaded into and executed by a machine, such as a computer, the machine becomes an apparatus for implementing performance regulation of a device utilizing a performance zone. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for performance regulation of a device utilizing a performance zone also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for performance regulation of a device utilizing a performance zone. When implemented on a general-purpose processor, the program code combines with the processor to provide a unique apparatus that operates to invoke the functionality regulating performance of a device utilizing a performance zone.

While performance regulation of a device utilizing a performance zone has been described in connection with the various embodiments of the various figures, it is to be understood that other similar embodiments can be used or modifications and additions can be made to the described embodiments for a mobile device configured to facilitate performance regulation of a device utilizing a performance zone without deviating therefrom. For example, one skilled in the art will recognize that a mobile device configured to facilitate performance regulation of a device utilizing a performance zone as described in the instant application may apply to any environment, and may be applied to any number of such devices connected via a communications network and interacting across the network. A mobile device configured to facilitate performance regulation of a device utilizing a performance zone should not be limited to any single embodiment, but rather should be construed in breadth and scope in accordance with the appended claims.

What is claimed:

1. A mobile device comprising:
a processor; and
memory coupled to the processor, the memory comprising executable instructions that when executed by the processor cause the processor to effectuate operations comprising:
determining a zone associated with a mobile device, wherein the zone comprises a zone to which the mobile device was handed off in order to achieve improved performance;
determining an indicator associated with the determined zone;
determining rules associated with the determined indicator, wherein:
the rules are stored on the mobile device;
determination of the rules is based on at least one of an identification of a cell, an indication of signal strength, a location of the mobile device, a channel condition, or a demand of a user of the mobile device; and
the rules are associated with performance in the zone regarding at least one of a subscriber related condition or a network related condition;
a zone is associated with a multi-dimensional color code; and
each color code of the multi-dimensional color code within a zone is indicative of at least one of:
a prevailing network condition;
a law governing use of an application; or
an ordinance governing use of an application;
querying a network to determine if any conditions exist that would change the color code or modify the rules associated with the color code; and
executing an application via the mobile device based on the determined rules.

2. The mobile device of claim 1, wherein the indicator comprises a color code.

3. The mobile device of claim 1, the operations further comprising:
storing rules associated with the indicator.

4. The mobile device of claim 1, wherein the zone is indicative of at least one of:
a portion of a region of coverage of a cellular site; or
a region of coverage of a wireless local area network.

5. The mobile device of claim 1, the operations further comprising:
during execution of the application, determining that a condition has changed;
determining a rule associated with the changed condition; and
subsequently executing the application via the mobile device based on the rule associated with the changed condition.

6. The mobile device of claim 1, the operations further comprising:
receiving an indication of a zone associated with the mobile device.

7. The mobile device of claim 1, the operations further comprising:
determining that the mobile device is associated with a new zone;
determining an indicator associated with the new zone; and
determining rules associated with the determined indicator associated with the new zone.

8. A method comprising:
determining a zone associated with a mobile device, wherein the zone comprises a zone to which the mobile device was handed off in order to achieve improved performance;
determining an indicator associated with the determined zone;
determining rules associated with the determined indicator, wherein:
the rules are stored on the mobile device;
determination of the rules is based on at least one of an identification of a cell, an indication of signal strength, a location of the mobile device, a channel condition, or a demand of a user of the mobile device; and the rules are associated with performance in the zone regarding at least one of a subscriber related condition or a network related condition;

a zone is associated with a multi-dimensional color code; and each color code of the multi-dimensional color code within a zone is indicative of at least one of:
 a prevailing network condition;
 a law governing use of an application; or
 an ordinance governing use of an application;

querying a network to determine if any conditions exist that would change the color code or modify the rules associated with the color code; and executing an application via the mobile device based on the determined rules.

9. The method of claim 8, wherein the indicator comprises a color code.

10. The method of claim 8, wherein the zone is indicative of at least one of:
 a portion of a region of coverage of a cellular site; or
 a region of coverage of a wireless local area network.

11. The method of claim 8, further comprising:
 during execution of the application, determining that a condition has changed;
 determining a rule associated with the changed condition; and
 subsequently executing the application via the mobile device based on the rule associated with the changed condition.

12. The method of claim 8, further comprising:
 determining that the mobile device is associated with a new zone;
 determining an indicator associated with the new zone; and
 determining rules associated with the determined indicator associated with the new zone.

13. The method of claim 8, wherein the method is performable by a system comprising at least one mobile device.

14. A computer-readable storage medium comprising computer-executable instructions that when executed by a processor cause the processor to effectuate operations comprising:
 determining a zone associated with a mobile device, wherein the zone comprises a zone to which the mobile device was handed off in order to achieve improved performance;
 determining an indicator associated with the determined zone;
 determining rules associated with the determined indicator, wherein:
  the rules are stored on the mobile device;
  determination of the rules is based on at least one of an identification of a cell, an indication of signal strength, a location of the mobile device, a channel condition, or a demand of a user of the mobile device; and
  the rules are associated with performance in the zone regarding at least one of a subscriber related condition or a network related condition;
  a zone is associated with a multi-dimensional color code; and
  each color code of the multi-dimensional color code within a zone is indicative of at least one of:
   a prevailing network condition;
   a law governing use of an application; or
   an ordinance governing use of an application;
 querying a network to determine if any conditions exist that would change the color code or modify the rules associated with the color code; and
 executing an application via the mobile device based on the determined rules.

15. The computer-readable storage medium of claim 14, wherein the zone is indicative of at least one of:
 a portion of a region of coverage of a cellular site; or
 a region of coverage of a wireless local area network.

16. The computer-readable storage medium of claim 14, the operations further comprising:
 during execution of the application, determining that a condition has changed;
 determining a rule associated with the changed condition; and
 providing an indication of the rule associated with the changed condition.

17. The computer-readable storage medium of claim 14, the operations further comprising:
 receiving an indication of a zone associated with the mobile device.

18. The computer-readable storage medium of claim 14, the operations further comprising:
 determining that the mobile device is associated with a new zone;
 determining an indicator associated with the new zone; and
 determining rules associated with the determined indicator associated with the new zone.

19. The computer-readable storage medium of claim 18, the operations further comprising:
 providing an indication of the rules associated with the determined indicator associated with the new zone.

* * * * *